(12) United States Patent
Stafford-Fraser et al.

(10) Patent No.: US 7,873,078 B2
(45) Date of Patent: Jan. 18, 2011

(54) SCREEN MULTIPLEXING

(75) Inventors: James Quentin Stafford-Fraser, Cambridge (GB); Timothy Holroyd Glauert, Cambridgeshire (GB)

(73) Assignee: Displaylink (UK) Limited, Cambridge (GB)

( * ) Notice: Subject to any disclaimer, the term of this patent is extended or adjusted under 35 U.S.C. 154(b) by 1309 days.

(21) Appl. No.: 11/005,711

(22) Filed: Dec. 7, 2004

(65) Prior Publication Data
US 2006/0120410 A1 Jun. 8, 2006

(51) Int. Cl.
H04J 3/04 (2006.01)
H04L 12/66 (2006.01)
H04N 7/18 (2006.01)

(52) U.S. Cl. .................. 370/535; 370/352; 348/153
(58) Field of Classification Search .................. 370/535, 370/538, 537, 536, 487, 485; 348/180, 189, 348/14.07, 553, 380, 377, 564, 173, 867
See application file for complete search history.

(56) References Cited

U.S. PATENT DOCUMENTS

| 6,028,643 | A |   | 2/2000 | Jordan et al. |
| 6,137,486 | A | * | 10/2000 | Yoshida et al. ............... 715/719 |
| 6,326,996 | B1 | * | 12/2001 | Brabander .................. 348/189 |
| 7,158,169 | B1 | * | 1/2007 | Farber et al. ................. 348/173 |
| 7,697,475 | B2 |   | 4/2010 | Wendling et al. |
| 2006/0026530 | A1 | * | 2/2006 | Shepherd et al. ............ 715/790 |
| 2008/0129822 | A1 | * | 6/2008 | Clapp et al. .................. 348/143 |

FOREIGN PATENT DOCUMENTS

| EP | WO01/86956 | 11/2001 |
| GB | 2 007 940 | 5/1979 |
| WO | 2004/086767 | 10/2004 |

OTHER PUBLICATIONS

VCS AG: "VIDOS - Recording and Alarm 1-4, Management system" 13-17, Feb. 1, 2002, Video 25-36 Communication Systems (VCS) AG, Nurnberg (DE), XP002369430.
VCS AG: "Provilook Instruction Manual", Nov. 1, 2001, Video Communication Systems (VCS) AG, Nurnberg (DE), XP002369429 p. 90; figures 2-5, p. 100 - p. 101, p. 141 - p. 147, p. 175 - p. 181.
International Search Report for PCT/GB2005/004647 dated Feb. 24, 2006.

* cited by examiner

Primary Examiner—Hanh Nguyen
(74) Attorney, Agent, or Firm—Workman Nydegger

(57) ABSTRACT

There is provided a screen multiplexor for processing graphical display data and an associated distribution method. A plurality of graphical display data streams is received at the multiplexor, processed and directed to one or more network-connected display devices. The network is a general purpose data network and may be wireless. The directed data streams can be spatially multiplexed, temporally multiplexed, and/or multiplexed in such a way that data from one stream is overlaid on data from another stream. The distribution method and screen multiplexor thus allow a flexible relationship between the number of screens and the sources of the information to be displayed thereon.

26 Claims, 1 Drawing Sheet

SCREEN MULTIPLEXING

FIELD OF THE INVENTION

The invention relates to the transmission of graphical data across digital connections, and more particularly, the transmission of graphical information across general-purpose data networks to network-connected displays.

BACKGROUND TO THE INVENTION

In the past, computer displays have generally been connected directly to the computers that are driving them by means of a 'monitor cable'. This direct electrical connection made it very clear which machine was driving which display. Increasingly, however, the electrical limitations of the cable, which mean that it cannot be more than a few meters long, and the lack of flexibility in this dedicated one-to-one mapping, have prompted the creation of displays and display adaptors which can be connected to a general-purpose data network such as Ethernet, USB, IEEE 1394, powerline, 802.11 or UWB wireless. Such systems allow a display to be placed at a much greater distance from the machine driving it, and allow one machine to drive many displays, or one display to be updated by many different machines. Henceforth in this document, we will use the term 'display' or 'screen' with the assumption that we are referring to display devices to which graphical information may be sent over the network.

SUMMARY OF THE INVENTION

According to one aspect of the present invention there is provided a method of distributing graphical display data, the method comprising: receiving a plurality of graphical display data streams from one or more sources; multiplexing the received graphical display data streams thereby creating one or more multiplexed data streams; and, directing the or each multiplexed data stream to one or more target display devices connected to a general purpose network.

The directed data streams are preferably spatially multiplexed, temporally multiplexed, and/or multiplexed in such a way that data from one stream is overlaid on data from another stream.

It is preferred that the multiplexing is dependent on the result of a further step of ascertaining the status of the one or more target display devices and plurality of graphical display data streams.

The method may further comprise the step of instructing at least one source to change the characteristics of the data stream received from the source in accordance with requirements of the or each target display device.

Advantageously, the method may further comprise the step of instructing at least one source to change the characteristics of the data stream received from the source in accordance with requirements of the or each multiplexed stream.

The instruction step preferably includes instructing a source not to provide a graphical data stream when this graphical data stream will not be incorporated in the multiplexed data stream.

Alternatively, the instruction step may include instructing a source to transmit graphical display data at a significantly lower rate if that display data will not be incorporated into the multiplexed data stream.

Additionally or alternatively, the instruction step may include instructing the source to transmit graphical display data at a significantly lower resolution than the full resolution available from that source.

Alternatively, the instruction step may include instructing the source to transmit graphical display data at a significantly lower colour-depth than the full colour-depth available from that source.

According to another aspect of the present invention, there is provided a screen multiplexor for processing graphical display data, the multiplexor having: a receiving means for receiving a plurality of graphical display data streams from one or more sources; a processing engine for multiplexing the graphical display data streams thereby creating one or more multiplexed data streams; and, transmission means for transmitting the or each multiplexed data stream to one or more target display devices connected to a general purpose data network.

Preferably, the screen multiplexor incorporates a number of network connections for receiving graphical display data streams.

Preferably, the screen multiplexor includes an interface to allow configuration of the processing engine. This interface may be a software interface accessible over a network, or may be a physical interface accessible at the screen multiplexor.

The screen multiplexor is preferably arranged to instruct at least one source to change the characteristics of the data stream received from the source in accordance with requirements of the or each target display device, thereby more effectively incorporating the input data stream in the multiplexed data stream(s).

The screen multiplexor may further comprise means for instructing a source not to provide a particular graphical display data stream if it is not required. For example, if the data is temporally multiplexed, a given graphical display data stream may be excluded from the multiplexed stream for a prolonged period of time. It is therefore advantageous in terms of network bandwidth usage for that display data stream not to be transmitted by the source during that time.

As an alternative to instructing the source not to send any data at all during such a time, the screen multiplexor may request less frequent updates at regular intervals. In this case, the transmission of data, but at a lower rate, serves to indicate that the source is still present. Alternatively, the less frequent updates may still ensure that, whenever data from that source is required once more, less data needs to be updated upon resuming reception of the data at normal rates.

Additionally or alternatively, the screen multiplexor may be arranged to instruct the source to transmit graphical display data at a significantly lower resolution than the full resolution available from that source, thereby facilitating multiplexing.

In a further preferred alternative, the screen multiplexor may be arranged to instruct the source to transmit graphical display data at a significantly lower colour-depth than the full colour-depth available from that source, thereby facilitating multiplexing.

The screen multiplexor entity providing these facilities could be built into the display, or implemented in hardware, firmware or software on the network, including a piece of software on the server generating the output. The software implementation may even be integrated with the software libraries generating the output.

According to a further aspect of the present invention, there is provided a system for multiplexing the transmission of graphical display data, the system comprising one or more source devices which transmit graphical display data streams; a multiplexor having a plurality of network end points that receive the graphical display data streams, wherein the multiplexor multiplexes the graphical display data streams thereby creating one or more multiplexed data streams, and then transmits the or each multiplexed stream; and, one or more target display devices connected to a general purpose data network which receive and display the or each multiplexed data stream.

The distribution method and screen multiplexor of the present invention allow a flexible relationship between the number of screens and the sources of the information to be displayed thereon. There are several ways in which the screen multiplexor may map graphical display data on to screens. These include, but are not limited to: spatial multiplexing; temporal multiplexing; and overlaying. The screen multiplexor may perform these operations separately or in combination with each other.

An example scenario where this is advantageous is an airport where several screenfuls of flight departure information would normally be displayed on several physical displays. There might be three or four displays in the main concourse, for example, and further information at each individual gate. In the executive lounge near one gate, the same information would be useful, but only one or two screens may be available. These screens, or proxies acting on their behalf, would intercept graphical data being distributed on the airport network to other screens. The data could then be spatially multiplexed so that, for example, data displayed on four displays on the main concourse could be displayed in four quadrants of a single screen in the executive lounge.

An example of the use of temporal multiplexing is an advertisement system where large numbers of network-connected 'billboard' displays are deployed in a shopping mall or around a city centre. Content providers may purchase time on these displays. They may produce content in a variety of formats, possibly live content requiring special software or even hardware to generate it. The owners of the advertising space can take these various content streams and configure the multiplexor to allocate the time and space in an appropriate way, without the content providers' systems needing to be aware of the mechanisms used.

A simple use of the overlaying facility provided by the present invention is to allow subtitles sent from in one graphical data stream to be overlaid on image data from another.

In one embodiment of the present invention the screen multiplexor may be able to ascertain the status of both the graphical display data streams and the target display devices. For example, if a display device were to cease functioning the screen multiplexor would be able to detect this and send the information intended for that device to another device. Similarly, if a graphical display data stream were interrupted the screen multiplexor could assign the screen space or time intended for that stream to another stream.

BRIEF DESCRIPTION OF THE DRAWINGS

Examples of the present invention will now be described in detail with reference to the accompanying drawing, in which.

DETAILED DESCRIPTION

Figure 1:
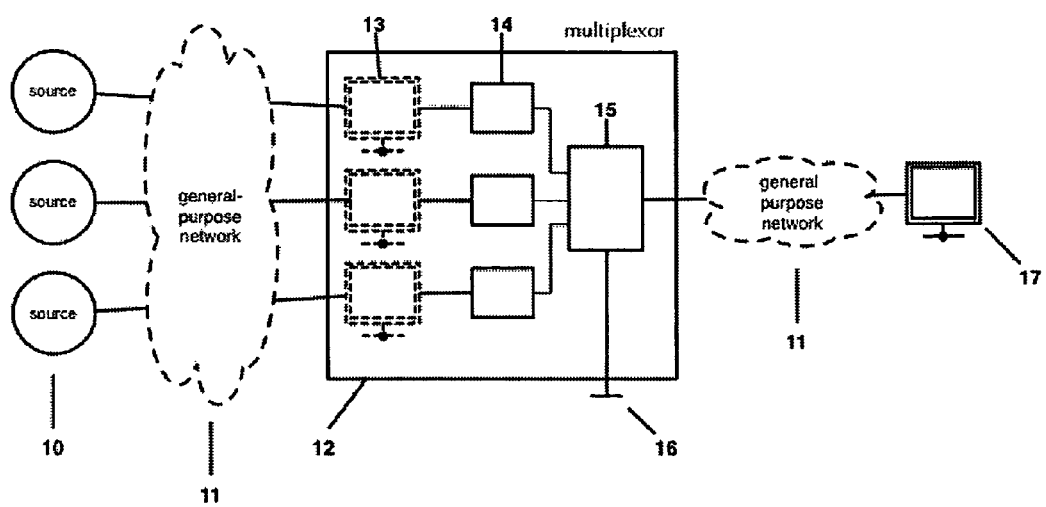
FIG. 1 is a schematic representation of one embodiment of the present invention.

Referring to FIG. 1, a system in accordance with the present invention includes one or more sources 10, a screen multiplexor 12 (which may or may not be connected to the sources by a general purpose network 11) and one or more network display devices 17 connected to the screen multiplexor via a general purpose network 11. Since these display devices 17 are able to receive data from a general purpose network, they will hereafter be referred to as network-enabled displays (NEDs). Each source may generate output intended for one or more display devices.

In the case that there is a network 11 between the sources 10 and the screen multiplexor 12, there is provided at the screen multiplexor 12 a number of network endpoints 13 which emulate NEDs. The source or sources thus interpret the endpoints 13 as the NEDs they expect to find on the network. Sometimes these will be actual physical sockets on a screen multiplexor device. More typically, they might be different IP (internet protocol) addresses or ports exposed through a single ethernet interface and supporting the same connection semantics as those of a NED. Alternatively, the screen multiplexor may be software at a source and may intercept data output before it is transmitted across any network.

There are several ways in which the screen multiplexor may then map the graphical display data on to the NEDs. These include, but are not limited to: spatial multiplexing; temporal multiplexing; and overlaying.

Spatial multiplexing involves shrinking screen images to give an n-up display: a ready example being a single screen presenting the display content of four display devices, dividing its screen space into four quadrants, and scaling and placing the incoming pixels for each stream, so that each apparent screen now occupies a quarter of the actual display. Other values of n are of course possible and the different streams do not all need to occupy the same display area, nor need they necessarily maintain their original aspect ratio, nor need the whole of a stream's image be visible at one time.

In temporal multiplexing, the screen shows all of the incoming image streams, but one at a time. A variety of events can cause it to switch from one stream to another. The simplest example is a timer causing the display to cycle through several streams—so that a 'slideshow' of separate streams is shown. The cycling need not be on a simple round-robin basis; it might be dependent on some other criteria such as how much an advertiser has paid.

Some examples of other events which could cause a switch in the streams include proximity sensors which detect a user approaching, microswitches which detect a door opening, temperature sensors, a button being pressed by a user etc. The switch could also be caused by network events, such as a company-wide announcement, or simply by the occurrence of updates occurring on a stream which was previously not being shown.

Finally, overlays include scenarios where the pixels from one stream can modify the image that would be displayed from another stream. A simple example is a subtitling system which sends a screen consisting mostly of one colour—to be ignored in a chroma-key type way—and subtitles in other colours which are to be overlaid on a second stream, the result being displayed.

Combinations of the above methods are possible. For example, a screen which is displaying one image stream may also, from time to time, overlay a smaller, translucent version of another stream for a limited period of time. This is a combination of spatial, temporal and overlay multiplexing.

In some of these methods there may be implications for the network protocols used to send the streams. For example, in a protocol involving flow control which can regulate how frequently updates come from the source, the multiplexor might 'throttle back' streams which are not currently being displayed to only send one frame per second, while those which are visible run at full frame-rate. Similarly, if the protocol allows for a change of resolution and the multiplexor is doing spatial multiplexing, it may request a smaller-size stream from the source. This sort of optimisation can reduce network and processor load both at the sources and at the multiplexor.

The screen multiplexor entity providing the above facilities may be: integral with display devices; a hardware device situated at a point on the network; software executing at some processing device on the network. The latter may include a piece of software executing on the server generating the output, possibly even integrated with the software libraries generating the output.

In a possible implementation, again referring to FIG. 1, data is received at the network endpoints 13 and is rendered into areas of framebuffer memory 14 in the multiplexor. A processing engine 15 takes data from these framebuffers and selects, scales, or otherwise modifies it before sending it over the network to the display 17. An interface 16 may be provided to allow the configuration of the processing engine. Typically this will be a software interface accessible over the network, perhaps using a web-browser, but it may also be a set of buttons and indicators on the multiplexor device.

The multiplexor device may further be able to detect when one or more NEDs 17 ceases functioning (it may, for example, have failed, been switched off or been disconnected). In this case the multiplexor may allocate the data intended for one screen to another. For example, if there are two streams of data driving two NEDs and one NED fails, the multiplexor may cause the multiplexed stream directed to the remaining NED to alternate between the two input streams, thereby ensuring that all information is still viewable. Furthermore, the multiplexor may be able to detect when a source ceases to provide useful data, and so allocate the NED previously intended for that source to another source.

Another preferred feature of the screen multiplexor is that it may be able to instruct the source to transmit only the graphical display data required at a given time. This allows more efficient use of network bandwidth. For example, if the graphical display data from a given source is not being currently displayed the screen multiplexor may be able to instruct the source not to send data until it is required. Alternatively the source may be instructed to send data intermittently so that the screen multiplexor may store a reasonably current copy of the source data in its framebuffer memory.

In addition to the possibility of requesting reduction or cessation of delivery of graphical data from a source, other instructions may be sent to a source to change the characteristics of the corresponding data stream. One such example is requesting lower resolution streams if it is known that an "n-up" display is required. A further example would be to request lower colour-depths if it is known that the display can only display a more limited range of colours. In this way the characteristics of its data stream may be altered for more effective incorporation in the multiplexed data stream.

Furthermore, the screen multiplexor may incorporate a proxy to 'hide' the NEDs it uses so that sources cannot connect to them directly if they are on the same network. In some environments there may be a concept of ownership of a display which enforces this. In the case where a source will only drive a particular NED or NEDs then the screen multiplexor may also include means to imitate that NED or those NEDs.

As will be clear from the preceding, the system in accordance with the invention may include a plurality of NEDs. While FIG. 1 shows only one NED, it illustrates only one embodiment of the invention. In embodiments where more than one NED is addressed, one or more multiplexed stream may be output by the multiplexor. Typically, each display has a corresponding data stream and that stream will be made up by multiplexing a plurality of input streams. To illustrate, consider an example with three input streams (A, B, & C) and two output streams, being transmitted to two monitors (X & Y). Stream X is multiplexed from A & B, while stream Y is multiplexed from B & C. Clearly, the invention is not limited to the outputting of a single multiplexed stream to one or more NEDs, and generally applies to the outputting of a plurality of multiplexed data streams, which may or may not correspond to respective NEDs.

The invention claimed is:

1. A method of distributing graphical display data, the method comprising:
   receiving via a general purpose network, at a number of network endpoints within a multiplexor where said network endpoints emulate network enabled displays, a plurality of graphical display data streams directly from one or more sources;
   multiplexing, in said multiplexor, a received graphical display data stream together with at least one other received graphical display data stream to create, at any given instant, a plurality of different multiplexed graphical data streams; and,
   directing the multiplexed graphical data streams directly from said multiplexor to one or more target display devices via a further general purpose network.

2. A method according to claim 1, wherein the directed data streams are spatially multiplexed.

3. A method according to claim 1, wherein the directed data streams are temporally multiplexed.

4. A method according to claim 1, wherein the directed data streams are multiplexed in such a way that data from one stream is overlaid on data from another stream.

5. A method according to claim 1, wherein the multiplexing is dependent on the result of the further step of ascertaining the status of the one or more target display devices and plurality of graphical display data streams.

6. A method according to claim 1, further comprising the step of instructing at least one of the one or more sources to change the characteristics of the data stream received from the source in accordance with requirements of the multiplexed streams.

7. A method according to claim 1, further comprising the step of instructing at least one of the one or more sources to change the characteristics of the data stream received from the source in accordance with requirements of the or each target display device.

8. A method according to claim 6, wherein the instruction step includes instructing the source not to provide a graphical data stream when this graphical data stream is not incorporated in the multiplexed data stream.

9. A method according to claim 6, wherein the instruction step includes instructing the source to transmit graphical display data at a significantly lower rate if that display data is not incorporated into the multiplexed data stream.

10. A method according to claim 6, wherein the instruction step includes instructing the source to transmit graphical display data at a significantly lower resolution than the full resolution available from that source, thereby facilitating multiplexing.

11. A method according to claim 6, wherein the instruction step includes instructing the source to transmit graphical display data at a significantly lower colour-depth than the full colour-depth available from that source, thereby facilitating multiplexing.

12. A screen multiplexor for processing graphical display data, the multiplexor having:
   a receiving means comprising a number of network endpoints emulating network enabled displays for receiving, via a general purpose network, a plurality of graphical display data streams directly from one or more sources;

means for multiplexing a received graphical display data stream together with at least one other received graphical display data stream to create, at any given instant, a plurality of different multiplexed graphical data streams; and transmission means for transmitting the plurality of different multiplexed graphical data streams directly from said multiplexor to one or more target display devices via a further general purpose network.

13. A screen multiplexor as claimed in claim 12, wherein the means for multiplexing spatially multiplexes the graphical display data streams.

14. A screen multiplexor as claimed in claim 12, wherein the means for multiplexing temporally multiplexes the graphical display data streams.

15. A screen multiplexor as claimed in claim 12, wherein the means for multiplexing multiplexes the graphical display data streams such that display data from one stream is overlaid on data from another stream.

16. A screen multiplexor as claimed in claim 12, wherein the screen multiplexor incorporates a number of network connections, thereby allowing data items from at least one source to be received by the screen multiplexor over the network.

17. A screen multiplexor as claimed in claim 12, wherein the screen multiplexor is arranged to ascertain the status of the one or more target display devices and plurality of graphical display data streams, and to multiplex the graphical display data streams accordingly.

18. A screen multiplexor as claimed in claim 12, wherein the screen multiplexor is arranged to instruct at least one of the one or more sources to change the characteristics of the data stream received from the source in accordance with requirements of the multiplexed streams.

19. A screen multiplexor as claimed in claim 12, wherein the screen multiplexor is arranged to instruct at least one source to change the characteristics of the data stream received from the source in accordance with requirements of the or each target display device.

20. A screen multiplexor as claimed in claim 18, wherein the screen multiplexor is arranged to instruct the source not to provide a graphical data stream when this graphical data stream is not incorporated in the multiplexed data streams.

21. A screen multiplexor as claimed in claim 18, wherein the screen multiplexor is arranged to instruct the source to transmit graphical display data at a significantly lower rate if that display data is not incorporated into the multiplexed data stream.

22. A screen multiplexor as claimed in claim 18, wherein the screen multiplexor is arranged to instruct the source to transmit graphical display data at a significantly lower resolution than the full resolution available from that source, thereby facilitating multiplexing.

23. A screen multiplexor as claimed in claim 18, wherein the screen multiplexor is arranged to instruct the source to transmit graphical display data at a significantly lower colour-depth than the full colour-depth available from that source, thereby facilitating multiplexing.

24. A system for multiplexing the transmission of graphical display data, the system comprising:

one or more source devices which transmit graphical display data streams;

a multiplexor having a plurality of network end points emulating network enabled displays that receive the graphical display data streams via a general purpose network directly from said one or more source devices, wherein the multiplexor multiplexes the received graphical display data streams to create, at any given instant, a plurality of different multiplexed graphical data streams, and then transmits the plurality of different multiplexed graphical data streams; and one or more target devices connected to a further general purpose network which receive and display the plurality of multiplexed graphical data streams directly from the multiplexor.

25. A system as claimed in claim 24, wherein the end points are physical sockets.

26. A system as claimed in claim 24, wherein the end points are software components executing on a network interface.

* * * * *